(12) United States Patent
Wall et al.

(10) Patent No.: US 7,965,692 B1
(45) Date of Patent: Jun. 21, 2011

(54) SYSTEMS AND METHODS FOR MOBILE NODE HANDOFF

(75) Inventors: Steve Wall, Reston, VA (US); Sid Chaudhuri, East Brunswick, NJ (US)

(73) Assignee: Nextel Communications Inc., Reston, VA (US)

( * ) Notice: Subject to any disclaimer, the term of this patent is extended or adjusted under 35 U.S.C. 154(b) by 724 days.

(21) Appl. No.: 11/516,761

(22) Filed: Sep. 7, 2006

(51) Int. Cl.
*H04W 4/00* (2009.01)
(52) U.S. Cl. .................. 370/338; 370/342; 455/331
(58) Field of Classification Search .............. 370/338, 370/331, 352, 349; 455/331, 432.1, 433, 455/436–439
See application file for complete search history.

(56) References Cited

U.S. PATENT DOCUMENTS

| | | | | |
|---|---|---|---|---|
| 5,943,620 | A * | 8/1999 | Boltz et al. | 455/445 |
| 6,798,763 | B1 * | 9/2004 | Kimura et al. | 370/338 |
| 6,816,912 | B1 | 11/2004 | Borella et al. | |
| 2003/0012172 | A1 * | 1/2003 | Choi et al. | 370/342 |
| 2006/0155878 | A1 * | 7/2006 | Narayanan et al. | 709/250 |
| 2006/0274759 | A1 * | 12/2006 | Maeda | 370/395.52 |

* cited by examiner

*Primary Examiner* — Kent Chang
*Assistant Examiner* — Dinh P Nguyen (57) ABSTRACT

Systems and methods for handoff of a mobile node between first and second points of attachment are provided. A communication between a first and second mobile node is optimized and conducted independent of a home agent. During the handoff process the communications directed to the mobile node performing the handoff are routed to the mobile node's home agent. Once the handoff process is complete the communication is again optimized and conducted independent of home agents.

13 Claims, 9 Drawing Sheets

SYSTEMS AND METHODS FOR MOBILE NODE HANDOFF

BACKGROUND OF THE INVENTION

Internet Protocol (IP) networks were originally designed to communicate packets between a host and a corresponding node (CN). A corresponding node can send data packets to the IP host by setting the destination of these packets to that of the IP host. The IP network discovers the connectivity of the network nodes and routes the data packet using standard topology discovery and IP protocols such as Open Shortest Path First (OSPF) and Border Gateway Protocol (BGP). With the knowledge of the network and the IP forwarding mechanisms, data packets flow from the corresponding node to the IP host typically along the shortest route in the network. Current IP networks predominantly use a specific IP addressing scheme and routing protocols known as IP version 4 (IPv4).

Figure 1:
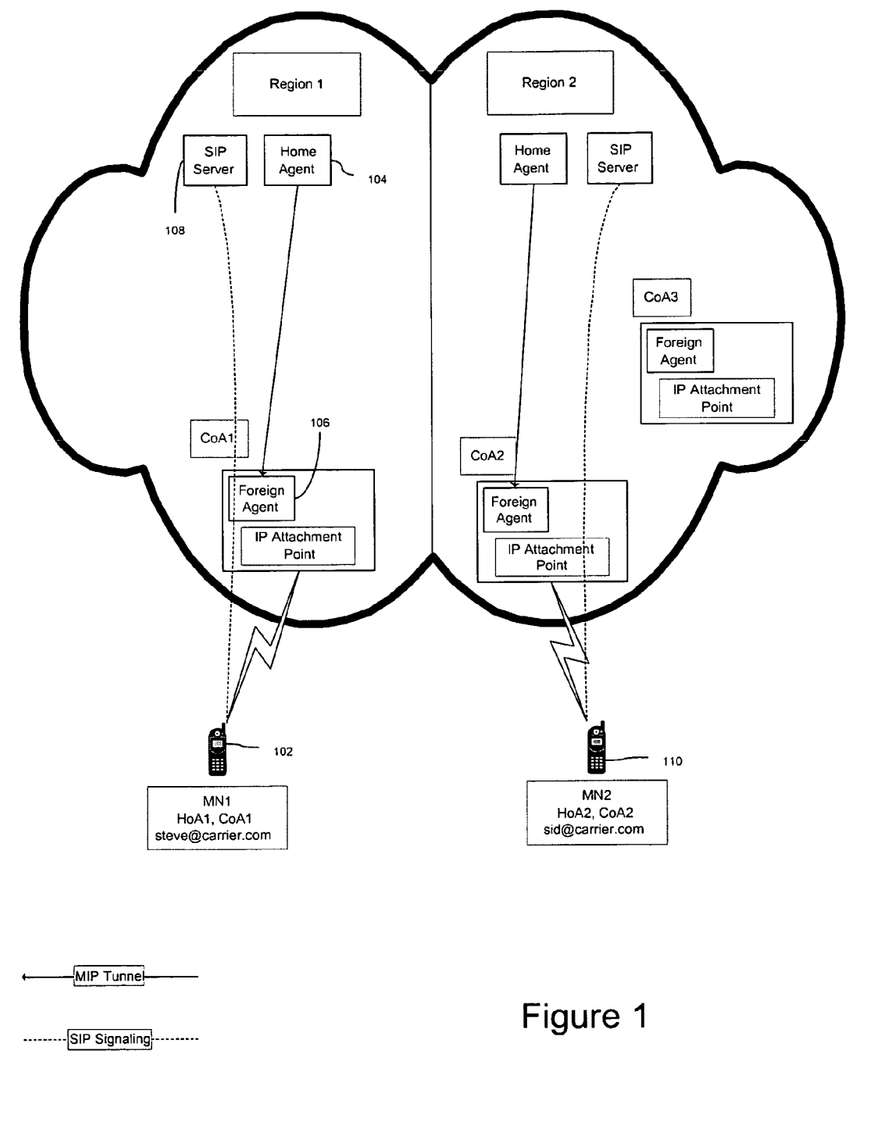
FIG. 1 is a block diagram of two mobile nodes that have both successfully completed both MIP and SIP registration in accordance with conventional procedures.

With the development of data applications such as Voice over IP (VoIP), Short Message Service (SMS), Multi-Media Messaging Service (MMS) in mobile networks it became necessary to extend signaling and routing protocols to enable communication with mobile devices that can attach to the network from anywhere via a local access point. With that objective in mind Mobile IPv4 (MIPv4) was developed. FIG. 1 illustrates a conventional network implementing MIPv4. As illustrated in FIG. 1, a mobile device 102 (hereafter called Mobile Node (MN)) is registered with a router 104 (hereafter called Home Agent (HA)). Home agent 104 assigns a Home Address (HoA) to mobile node 102 from an IP subnetwork ("subnet") that home agent 104 advertises into the IP network. This HoA of mobile node 102 is fixed regardless of the location of mobile node 102.

In FIG. 1 Mobile Node 1 (MN1) 102 has registered in Region 1 with its local MIP home agent. A router with which the mobile node is currently attached is called the Foreign Agent (FA), which is foreign agent 106 for MN1 102. The address of the Foreign Agent becomes the Care of Address (CoA) of mobile node 102. As illustrated in FIG. 1, in accordance with MIPv4 a MIP tunnel is established from the home agent 104 to foreign agent 106. Home agent 104 uses the MIP tunnel to forward packets to the MN1 102. Home agent 104 routes all traffic destined for MN1's 102 Home Address 1 (HoA1) through this tunnel, and foreign agent 106 at CoA1 forwards the traffic to MN1 102. For the purposes of this discussion, it is assumed that MIP Reverse Tunneling is always set to off.

MN1 102 has also completed SIP registration with SIP server 108, which has associated MN1's SIP address (steve@carrier.com) with HoA1 within the SIP infrastructure. Similarly, MN2 110 has completed MIP and SIP registration, which has established IP reachability for MN2 110 at HoA2 via CoA2 and SIP reachability at his SIP address (sid@carrier.com).

When the mobile node registers with the home agent via the foreign agent, the home agent creates a binding between the HoA and CoA and creates a tunnel for forwarding data packets addressed to HoA for the mobile node using a standard technique called IP in IP tunneling. Any corresponding node communicating with the mobile node regardless of the location of the mobile node, sends data packets to the HoA of the mobile node. Since the home agent always advertises the subnet of the mobile node, the data packets with a destination address equal to the HoA of the mobile node are always first routed to the home agent. The home agent subsequently uses the IP tunneling mechanism discussed above to forward the data packets to the CoA of the foreign agent, which then forwards the data packets to the appropriate link reaching the mobile node.

In the standard MIPv4 mechanism it is evident that the communication route for data traffic from a corresponding node to a mobile node must always pass through the home agent and then be forwarded from the home agent to the foreign agent using the current CoA associated with the mobile node. This mechanism does not allow data traffic to flow along the shortest route from the corresponding node to the mobile node. The un-optimized route for data traffic causes several deficiencies in communication quality. First, because the route may be unnecessarily long, the end-to-end transmission delay can be significantly longer than when the route does not pass through a home agent. Longer delays may cause significant quality degradation in delay-sensitive services such as VoIP and Push-to-talk over Cellular (PoC). Typically, delay in a mobile network is longer than fixed networks. Thus, additional delay may be particularly detrimental in mobile networks. Second, traffic to all the mobile nodes registered with a home agent must pass through the home agent causing congestion. In addition, a single home agent failure could unnecessarily disrupt all traffic routed through the home agent. Thus, routing performance could be degraded in the network due to the requirement that a home agent is in the forwarding path for networks using conventional MIPv4 routing. Third, more network bandwidth is required to carry traffic in a non-optimal way. More network bandwidth requirement leads to more expensive network.

Figure 2:
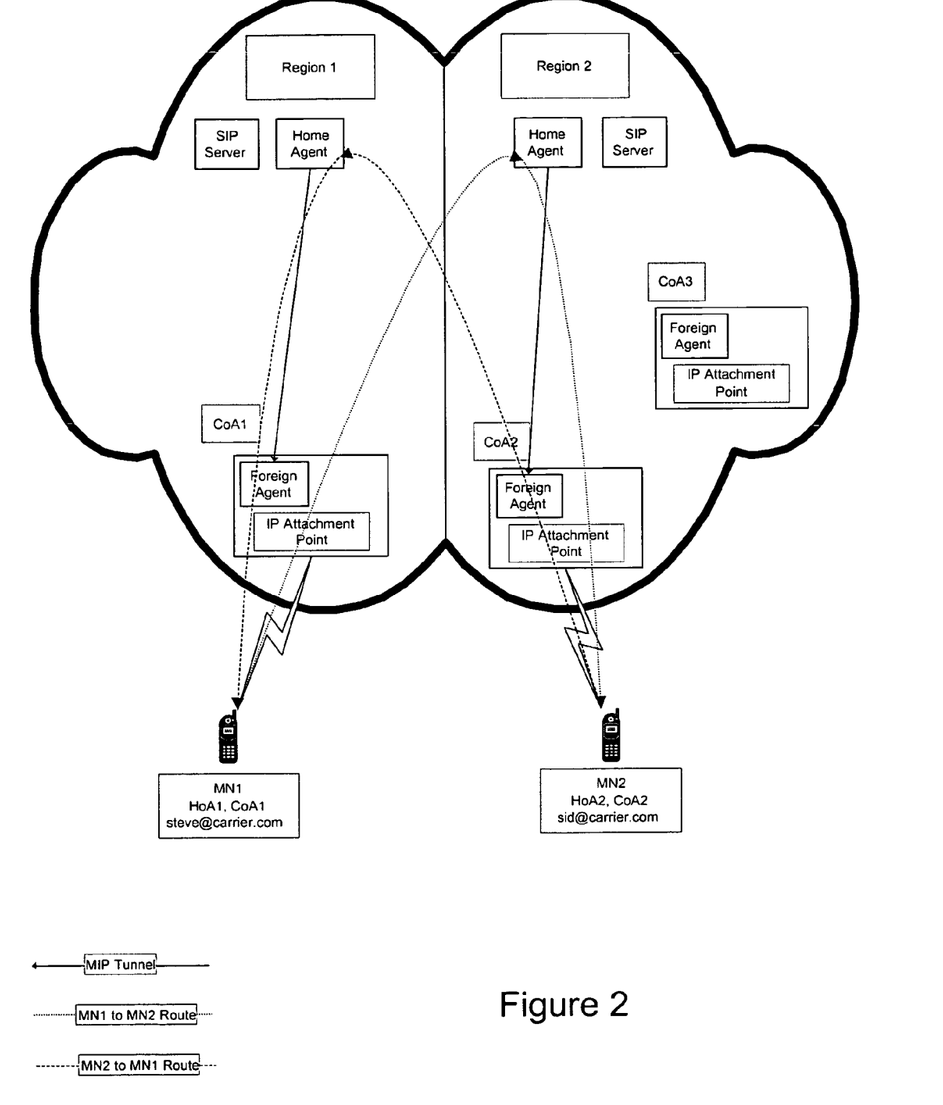
FIG. 2 is a block diagram illustrating the forwarding paths of the RTP/UDP and RTCP/UDP bearer streams between two mobile nodes in a VoIP call based in conventional systems.

Using MIPv4, mobile-to-mobile bearer traffic is forwarded through the MIP tunnels setup using MIPv4 as illustrated in FIG. 2. This ensures seamless mobility as the mobiles change their point of attachment. Specifically, the user datagram protocol (UDP) port numbers used by the real-time protocol (RTP)/UDP and real-time control protocol (RTCP)/UDP streams are negotiated and signaled by the SIP infrastructure between the mobile nodes, and the mobile nodes' HoAs are used as the IP endpoints of these streams.

The next-generation mobile IP network protocol, commonly known as IPv6, addresses this particular problem by providing a "route optimization" mode. This mode requires the mobile node to register its current binding with the corresponding node. Packets from the corresponding node are routed directly to the CoA of the mobile node. When sending a packet to the IPv6 destination of the mobile node, the corresponding node checks its bindings for an entry for the packet's destination address. If a cached binding for this destination address is found, the corresponding node uses a new type of IPv6 routing header to route the packet to the mobile node directly to the CoA indicated in this binding. Routing packets directly to the mobile node's CoA allows the shortest communications path to be used.

This method for solving the un-optimized routing problem has three fundamental drawbacks. First, MIPv6 is not ubiquitously deployed and it may take a long while to change the IPv4 and MIPv4 networks to IPv6 and MIPv6. Second, since MIPv6 is implemented in the network layer when a mobile node changes its location all the different corresponding nodes that may possibly communicate with the mobile node must be notified about the current CoA of the mobile node so that all the corresponding nodes can refresh the binding. Thus, this method may suffer from a lack of scalability with respect to mobility. Third, MIPv6 route optimization requires that all mobile nodes and corresponding nodes trust each other with respect to the exchange of bindings containing routing information. Therefore, security could pose a challenge to MIPv6 implementations.

In view of the foregoing, there is a need for a method and system for route optimization in an existing MIPv4 network without changing the IP network infrastructure, functions and protocols. Furthermore, there is a need for a system and method for route optimization in a mobile environment that is scalable and can be implemented on a peer-to-peer basis and on selected services basis.

SUMMARY OF THE INVENTION

Systems and methods for handoff of mobile nodes are provided. According to exemplary embodiments of the present invention, after establishing a call using standard MIPv4, first and second mobile nodes optimize the call, thereafter conducting the call independent of home agents. When one of the mobile nodes initiates a handoff to another point of attachment, communications directed to that mobile node are again routed through a home agent using a MIP tunnel. Upon completion of the handoff the communications are again optimized, and are conducted independent of home agents.

Other objects, advantages and novel features of the present invention will become apparent from the following detailed description of the invention when considered in conjunction with the accompanying drawings.

DETAILED DESCRIPTION OF THE PREFERRED EMBODIMENTS

Exemplary embodiments of the present invention provide systems and methods for route optimization of peer-to-peer applications in a mobile environment. This allows applications to overcome the restriction imposed by MIPv4 that all traffic must pass through a home agent. All peer-to-peer applications will benefit from route optimization, but for the purposes of illustration and not limitation, the present invention will be described below in connection with Voice over IP (VoIP). In accordance with exemplary embodiments of the present invention, mobile nodes communicate with each other using SIP for signaling and RTP for media.

Figure 3:
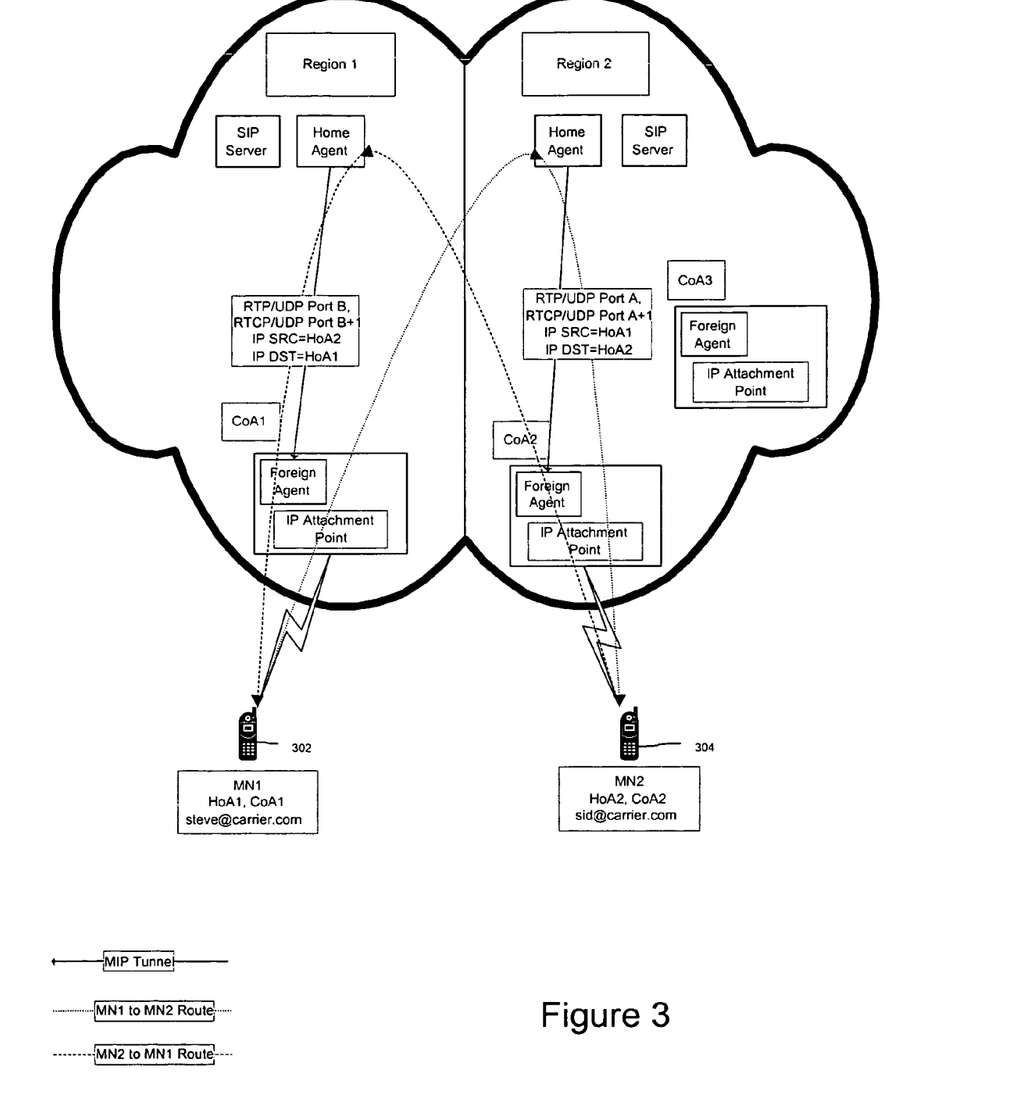
FIG. 3 is a block diagram illustrating the first step for detecting UDP ports and source/destination IP addresses of the RTP/UDP and RTCP/UDP bearer streams between two mobile nodes in accordance with exemplary embodiments of the present invention.

FIG. 3 illustrates the first step for detecting RTP/UDP and RTCP/UDP port numbers between the two foreign agents and the IP attachment points of the mobile nodes in accordance with exemplary embodiments of the present invention. Each IP attachment point foreign agent detects RTP/UDP UDP port, RTP/UDP source IP address, RTP/UDP destination IP address, RTCP/UDP UDP port, RTCP/UDP source IP address and RTCP/UDP destination IP address for each matching stream.

For security, the IP attachment point checks both the RTP/UDP and RTCP/UDP source IP addresses to ensure they are in the trusted range before further processing. If the source IP addresses are legitimate, the IP attachment point foreign agent begins installing bindings for each unique RTP/UDP or RTCP/UDP flow that is detected. These bindings govern the forwarding behavior of future flows.

As illustrated in FIG. 3, the bindings for flows from MN1 302 to MN2 304 have the RTP/UDP/IP source address=HoA1, RTP/UDP/IP destination address=HoA2, RTP/UDP port=A, RTCP/UDP/IP source address=HoA1, RTCP/UDP/IP destination address=HoA2 and RTCP/UDP port=A+1. The bindings for flows from MN2 to MN1 have the RTP/UDP/IP source address=HoA2, RTP/UDP/IP destination address=HoA1, RTP/UDP port=B, RTCP/UDP/IP source address=HoA2, RTCP/UDP/IP destination address=HoA1, and RTCP/UDP port=B+1.

Figure 4:
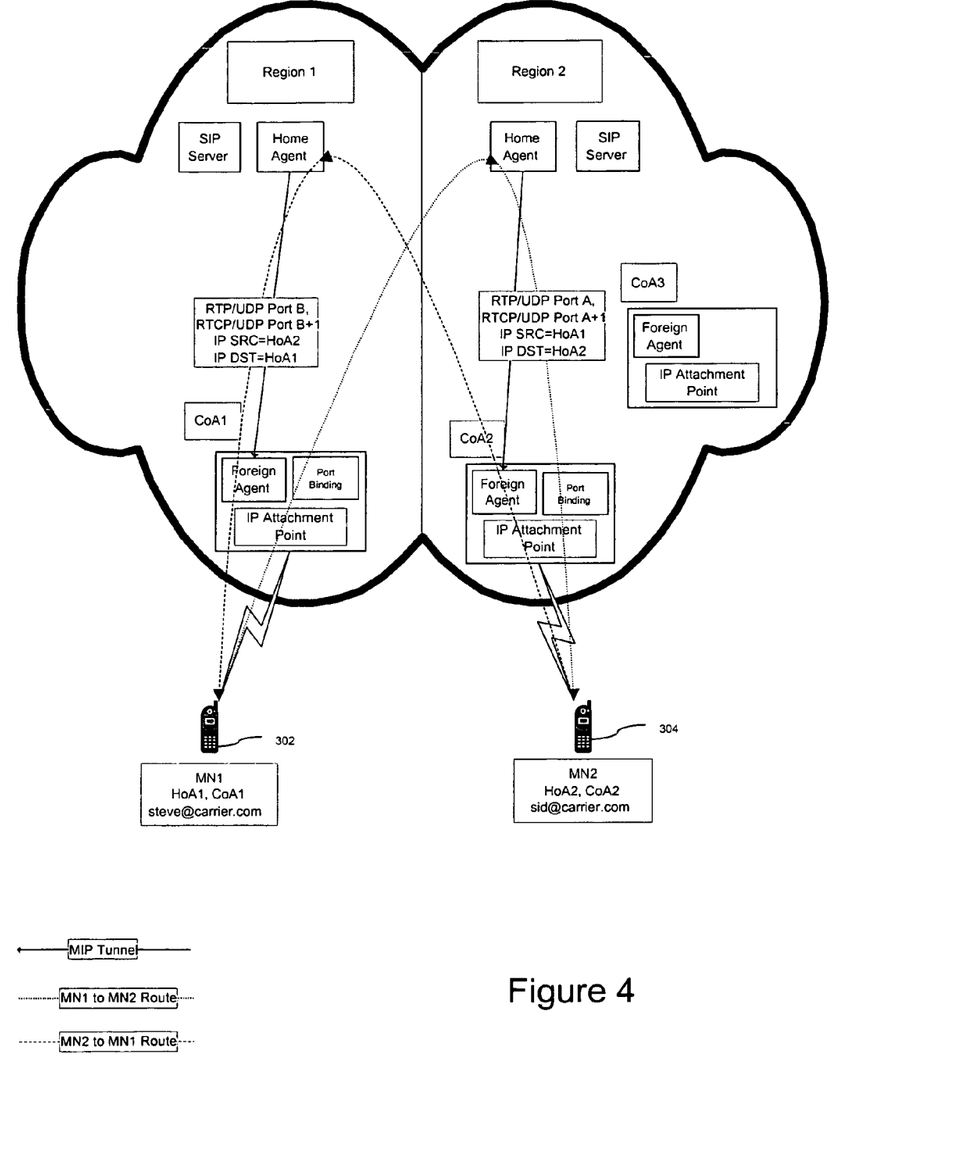
FIG. 4 is a block diagram illustrating the second step of the route optimization of exemplary embodiments of the present invention.
Figure 5:
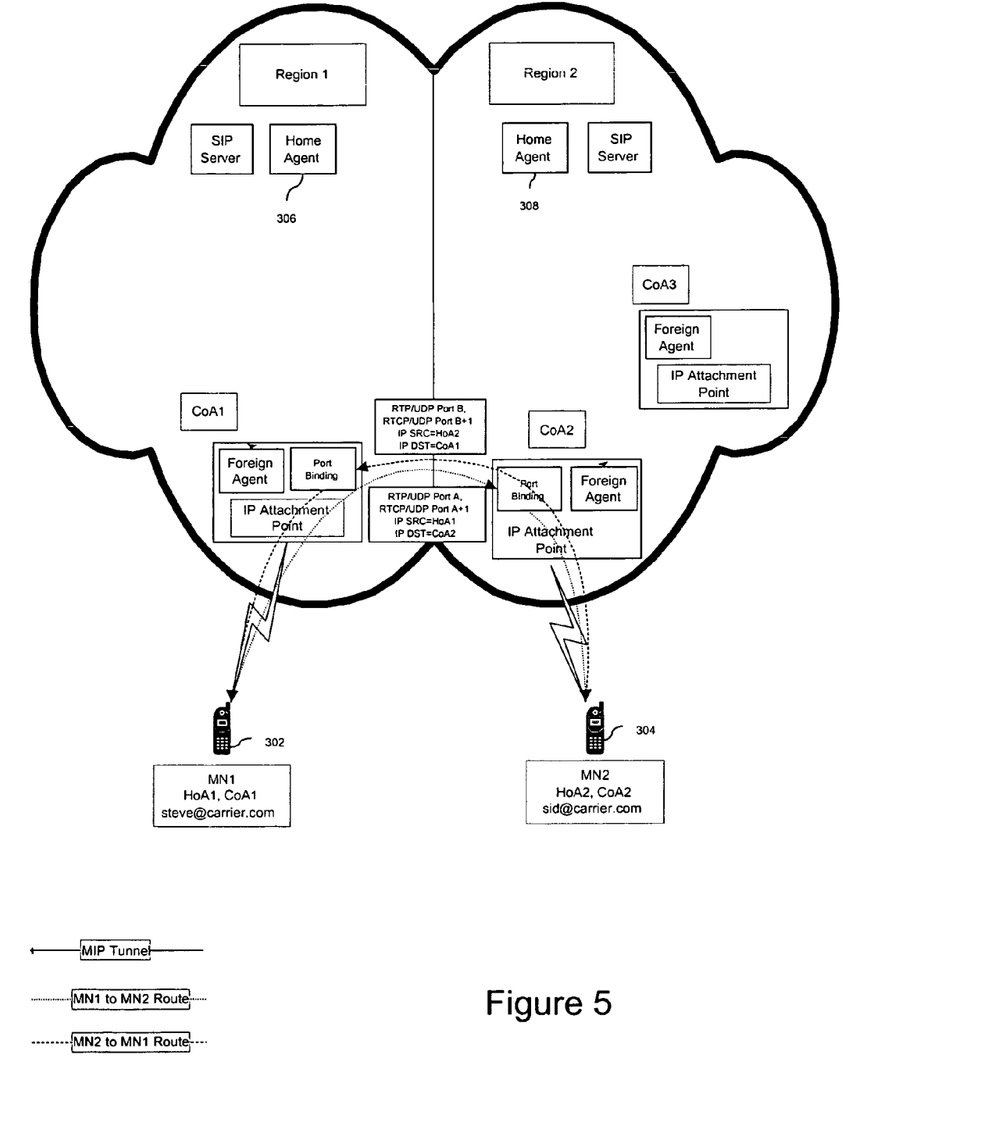
FIG. 5 is a block diagram illustrating the third step of the route optimization of exemplary embodiments of the present invention.

FIGS. 4 and 5 are block diagrams illustrating the second and third steps for route optimization in accordance with exemplary embodiments of the present invention. Initially, port bindings for the incoming RTP/UDP and RTCP/UDP streams are established at the local point of attachment for mobile nodes MN1 302 and MN2 304. After establishing the port bindings, the incoming RTP/UDP and RTCP/UDP streams are redirected via RTCP/UDP signaling of the CoA.

These two flows trigger the insertion of RTP/UDP and RTCP/UDP bindings at both IP attachment points. The bindings at the IP attachment point with CoA1 impose the following forwarding rules:

1) For RTP:
IF (RTP/UDP/IP destination IP address=CoA1) and (RTP/UDP/IP source IP address=HoA2) and (RTP/UDP/IP UDP port=B)
THEN (Forward to HoA1)
2) For RTCP:
IF (RTCP/UDP/IP destination IP address=CoA1) and (RTCP/UDP/IP source IP address=HoA2) and (RTCP/UDP/IP UDP port=B+1)
THEN (Forward to HoA1)

The bindings at the IP attachment point with CoA2 impose the following forwarding rules:

1) For RTP:
IF (RTP/UDP/IP destination IP address=CoA2) and (RTP/UDP/IP source IP address=HoA1) and (RTP/UDP/IP UDP port=A)
THEN (Forward to HoA2)
2) For RTCP:
IF (RTCP/UDP/IP destination IP address=CoA2) and (RTCP/UDP/IP source IP address=HoA1) and (RTCP/UDP/IP UDP port=A+1)
THEN (Forward to HoA2)

Following the installation of the bindings described above, each mobile node signals the other via RTCP/UDP signaling using a type 204 application defined RTCP packet as specified in RFC 3550, "RTP: A Transport Protocol for Real-Time Applications." This packet has the following structure:

Referring now to FIG. 5, the destination IP address of the outgoing RTP/UDP and RTCP/UDP streams are now changed from the remote HoA to the remote CoA. This allows each mobile node to send his CoA to the other mobile node. Each mobile node then reacts by changing the destination IP address for the corresponding outgoing RTP/UDP and RTCP/UDP streams to redirect these streams directly to the remote CoA, bypassing the home agent. The MIP tunnels are no longer needed and thus home agents 306 and 308 may remove the tunnels.

An alternative method for a mobile node to notify its VoIP peer to change the destination of its RTP/UDP and RTCP/UDP streams is to simply change the source IP address of its outgoing RTP/UDP and RTCP/UDP streams to the local CoA and have the VoIP peer respond by redirecting its outgoing RTP/UDP and RTCP/UDP flows to this CoA, thus bypassing the home agent and optimizing the route. In this scenario, the bindings installed within the IP attachment points would be formed based on the remote HoA embedded within the RTP header, not the source IP address of the RTP streams itself. This method is extensible to any flow for which there are bits available to embed the remote HoA.

Figure 6:
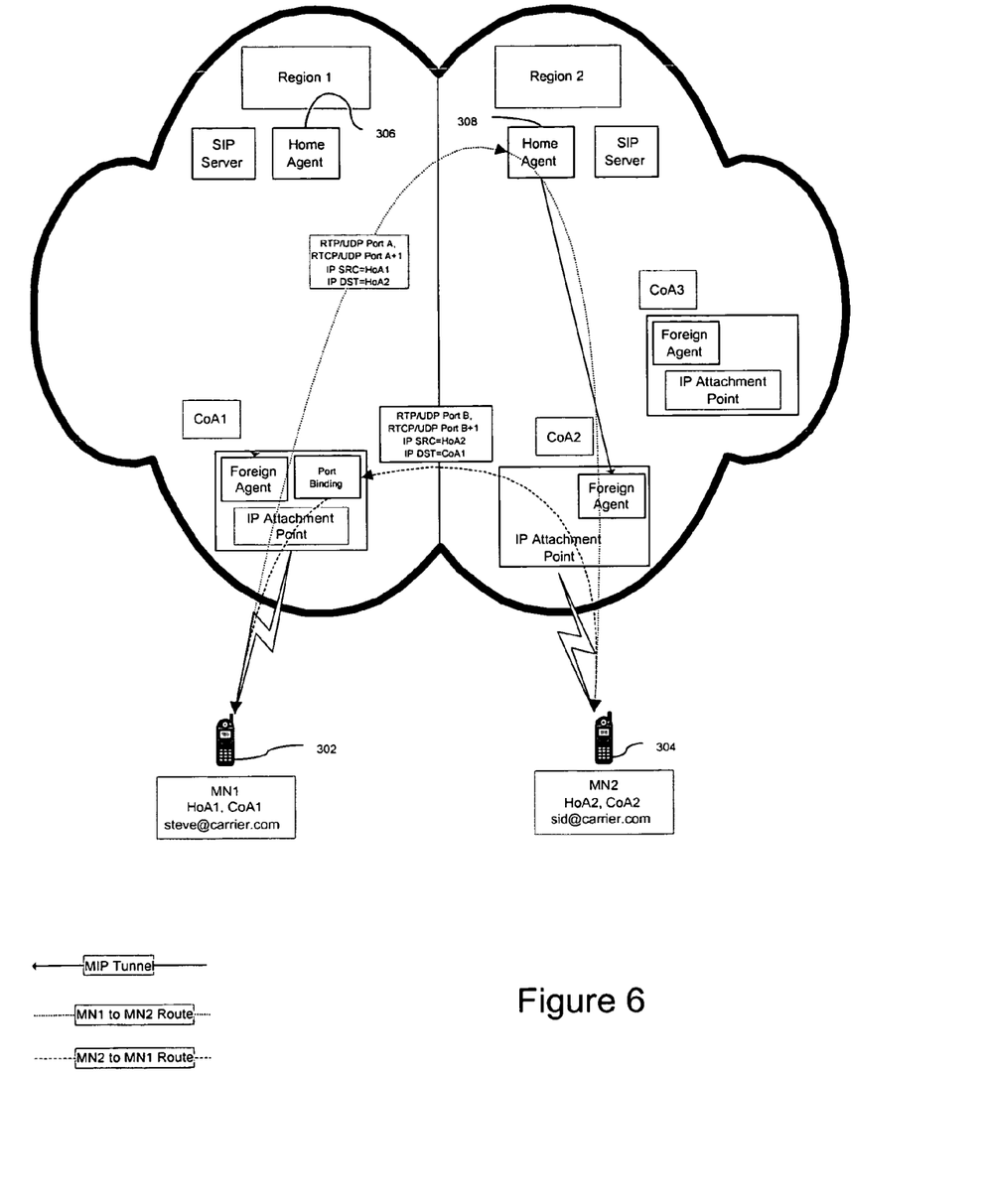
FIG. 6 is a block diagram illustrating the first step of the handoff procedure in accordance with exemplary embodiments of the present invention.
Figure 7:
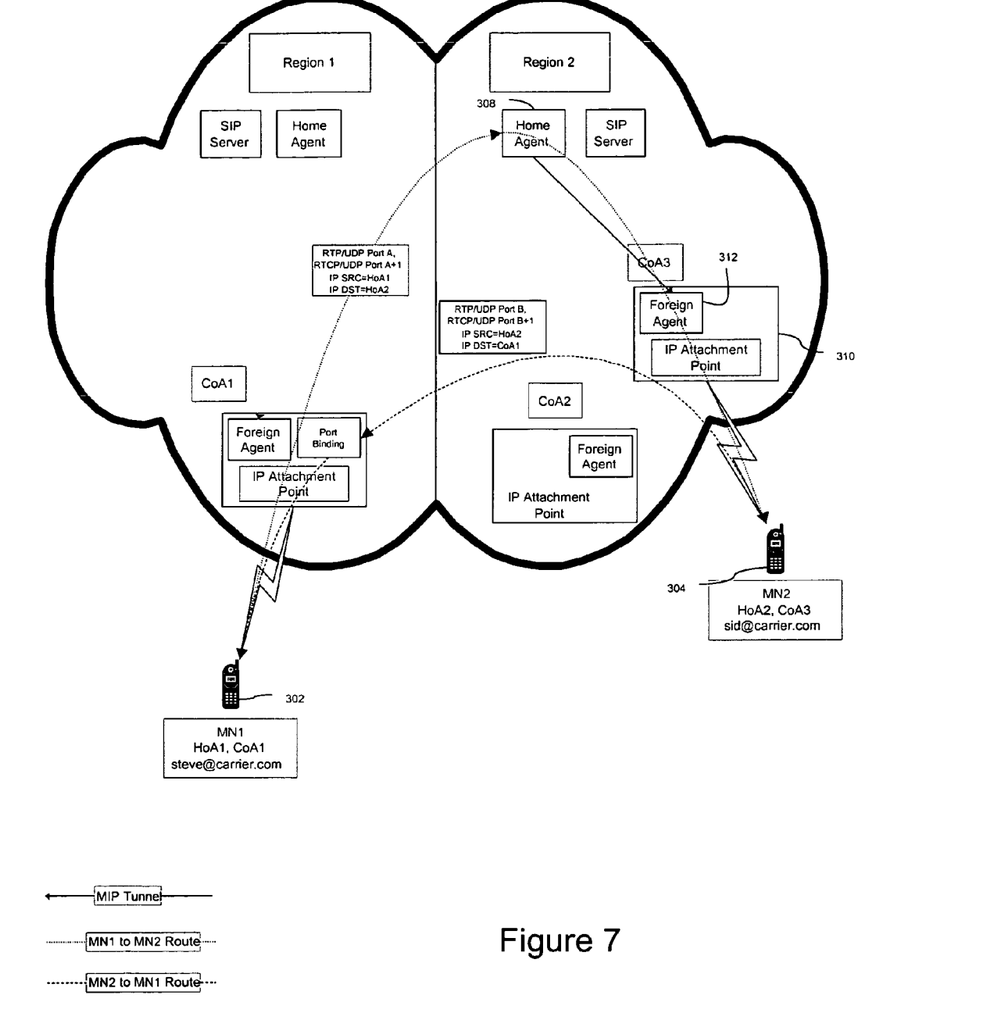
FIG. 7 is a block diagram illustrating the second step of the handoff procedure in accordance with exemplary embodiments of the present invention.
Figure 8:
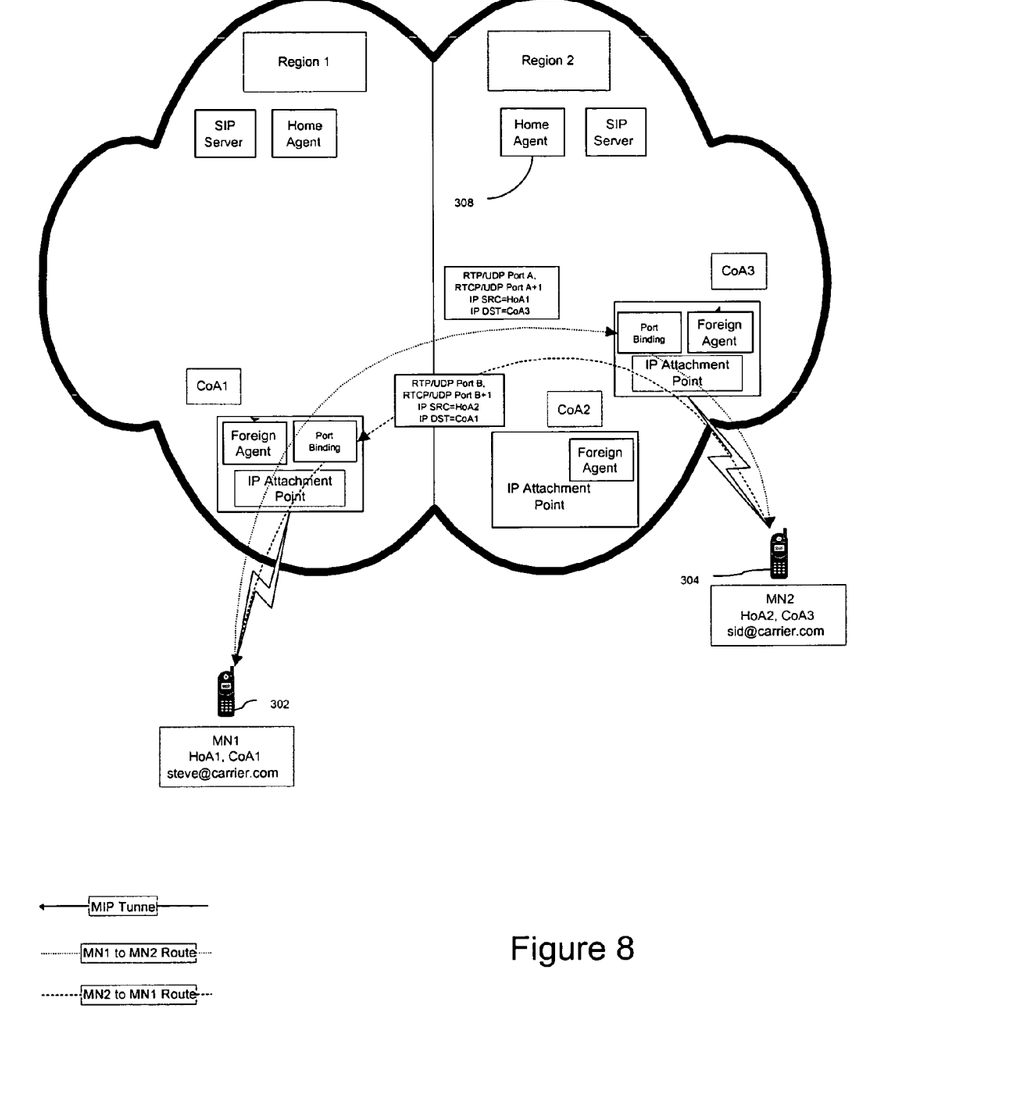
FIG. 8 is a block diagram illustrating the third step in the handoff procedure in accordance with exemplary embodiments of the present invention.

FIGS. 6-8 are block diagrams illustrating the handoff procedure for MN2 304 in accordance with exemplary embodiments of the present invention. Initially, incoming RTP/UDP and RTCP/UDP streams are redirected via RTCP/UDP signaling of the CoA to MN1 302. Next, as illustrated in FIG. 7, MN2 304 hands-off to a new IP point of attachment 310. This results in a CoA change. Accordingly, as illustrated in FIG. 8 port bindings at the new local attachment point 310 are established for the incoming RTP/UDP and RTCP/UDP streams. Next, the incoming RTP/UDP and RTCP/UDP streams are redirected via RTCP/UDP signaling of the CoA to MN1 302.

When a mobile node moves from one foreign agent to another foreign agent the mobile node obtains CoA and new UDP ports at the new foreign agent. In order for standard hand-off procedures to work in a MIPv4 network, the first step of the original MIPv4 routing configuration should be performed pursuant to FIG. 3. Before a mobile node hands off, it first un-optimizes its incoming stream (i.e., routes communications through the home agent), then handoffs and finally re-optimizes its incoming stream (i.e., communicates independent of the home agent). This is shown in FIGS. 6-8. To un-optimize its incoming RTP/UDP and RTCP/UDP streams, MN2 304 sends an application specific RTCP packet containing HoA2, which causes MN1 302 to begin forwarding its corresponding outgoing RTP/UDP and RTCP/UDP streams to HoA2 via home agent 308 which sends the packets to MN2 via the MIPv4 tunnel between home agent 308 and foreign agent 312. After normal handoff processing, the new IP attachment point at CoA3 installs port bindings for the MN1-to-MN2 RTP/UDP and RTCP/UDP flows, and then MN2 304 sends another application defined RTCP packet to MN1 302 containing CoA3, which causes MN1 302 to begin forwarding its corresponding outgoing RTP/UDP and RTCP/UDP streams directly to CoA3 as illustrated in FIG. 8, bypassing home agent 308.

Figure 9:
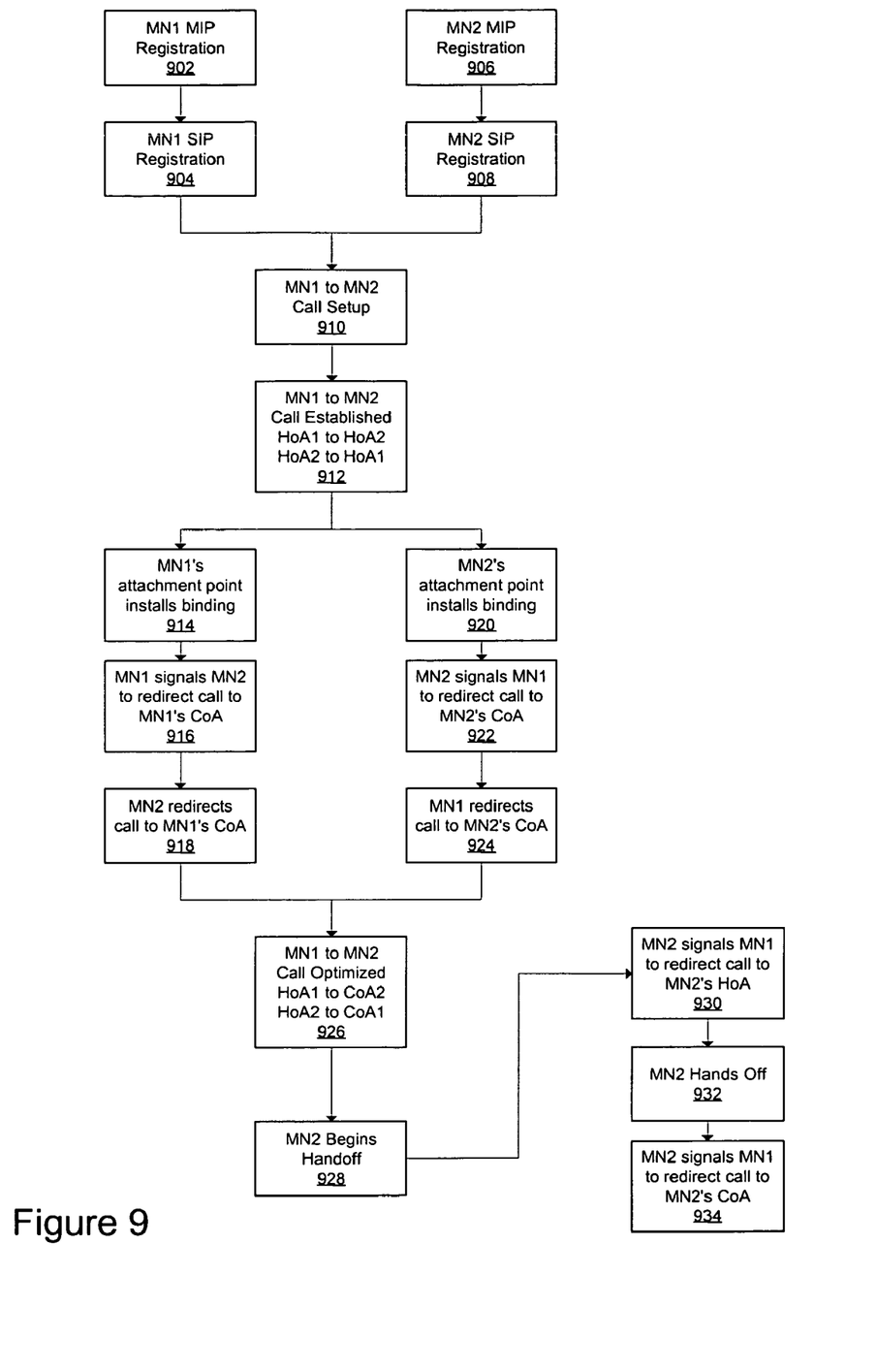
FIG. 9 is a flow chart illustrating an exemplary method for route optimization in accordance with the present invention.

FIG. 9 is a flow chart illustrating an exemplary method for route optimization in accordance with the present invention. Initially, mobile nodes MN1 and MN2 perform MIP and SIP registration (steps 902-908). MN1 then initiates a call setup to MN2 (step 910) and a call is established between the mobile nodes via home agents (step 912). The attachment points for mobile nodes MN1 and MN2 install the binding for the call (steps 914 and 920). MN1 then signals MN2 to redirect calls to MN1's CoA (step 916), and MN2 signals MN1 to redirect calls to MN2's CoA (step 922). MN2 then redirects the call to MN1's CoA (step 918) and MN1 redirects the call to MN2's CoA (step 924). Accordingly, the call between mobile nodes MN1 and MN2 is optimized (step 926).

When MN2 begins handoff from one point of attachment to another (step 928), MN2 signals MN1 to redirect calls to MN2's HoA (step 930). MN2 then hands-off to the new point of attachment (step 932) and signals to MN1 to redirect the call to MN2's CoA (step 934).

The peer-to-peer route optimization of the present invention decreases latency, provides a more efficient distributed transport utilization, and improves the call quality of VoIP and other delay sensitive applications. Although exemplary embodiments have been described in connection with VoIP calls, the present invention is equally applicable to any type of communications between at least one mobile node and another node.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communication between a first mobile node and a second mobile node in a network implementing Mobile Internet Protocol version 4, the method comprising:
   assigning, by a first foreign agent, a first Care of Address (CoA) to the first mobile node;
   communicating, by the first mobile node, with the second mobile node via the first foreign agent and a home agent of the first mobile node;
   detecting at least one Real-Time Protocol (RTP)/User Datagram Protocol (UDP) data flow from the second mobile node to the first mobile node;
   installing a binding for the at least one RTP/UDP data flow, the binding comprising a destination address for the at least one RTP/UDP data flow, wherein the destination address is the address of the home agent of the first mobile node;

replacing the destination address of each binding with the first CoA assigned to the first mobile node;

receiving, by the first mobile node during a first time period, the at least one RTP/UDP data flow from the second mobile node independent of the home agent of the first mobile node;

replacing the destination address of each binding with the address of the home agent of the first mobile node;

receiving, by the first mobile node during a second time period, the at least one RTP/UDP data flow from the second mobile node through the home agent of the first mobile node;

assigning, by a second foreign agent, a second CoA to the first mobile node;

replacing the destination address of each binding with the second CoA assigned to the first mobile node;

receiving, by the first mobile node during a third time period, the at least one RTP/UDP data flow from the second mobile node independent of the home agent of the first mobile node;

wherein the second time period is subsequent to the first time period and the third time period is subsequent to the second time period.

2. The method of claim 1, wherein the first and second mobile nodes communicate control information using session initiation protocol (SIP) signaling.

3. The method of claim 2, wherein the first and second mobile nodes exchange media using RTP signaling.

4. The method of claim 1, further comprising:
transmitting, by the first mobile node during the first time period, a redirection message identifying that communications to the first mobile node should be sent via the home agent.

5. The method of claim 1, further comprising:
transmitting, by the first mobile node during the second time period, a redirection message identifying that communications to the first mobile node should be sent independent of the home agent.

6. The method of claim 1, wherein the first and second mobile nodes communicate using internet protocol (IP).

7. The method of claim 6, wherein the internet protocol is mobile internet protocol (MIP).

8. The method of claim 7, wherein the mobile internet protocol is MIPv4.

9. The method of claim 1, wherein the first mobile node is supported by a first point of attachment during the first time period.

10. The method of claim 9, wherein the first mobile node is supported by the first point of attachment and a second point of attachment during the second time period.

11. The method of claim 10, wherein the first mobile node is supported by the second point of attachment during the third time period.

12. The method of claim 6, wherein the first and second mobile nodes communicate control information using real-time transport control protocol (RTCP).

13. The method of claim 12, wherein the first and second mobile nodes exchange media using real-time protocol (RTP) signaling.

* * * * *